(12) United States Patent
Kim et al.

(10) Patent No.: US 10,666,759 B2
(45) Date of Patent: *May 26, 2020

(54) COMMUNICATION METHOD OF NODE OVERHEARING CONTENT IN CONTENT CENTRIC NETWORK AND NODE

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Jae Hoon Kim, Yongin-si (KR); Myeong Wuk Jang, Hwaseong-si (KR); Yung Bae Ko, Suwon-si (KR); Sung Won Lee, Suwon-si (KR)

(73) Assignees: Samsung Electronics Co., Ltd., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 88 days.

This patent is subject to a terminal disclaimer.

(21) Appl. No.: 15/601,469

(22) Filed: May 22, 2017

(65) Prior Publication Data
US 2017/0264705 A1 Sep. 14, 2017

Related U.S. Application Data

(63) Continuation of application No. 14/300,365, filed on Jun. 10, 2014, now Pat. No. 9,661,098.

(30) Foreign Application Priority Data

Jun. 11, 2013 (KR) .................. 10-2013-0066716

(51) Int. Cl.
H04L 29/08 (2006.01)

(52) U.S. Cl.
CPC .... H04L 67/2857 (2013.01); H04L 29/08729 (2013.01); H04L 29/08801 (2013.01); H04L 67/2842 (2013.01); H04L 67/327 (2013.01)

(58) Field of Classification Search
CPC ....... G06Q 20/12; H04L 1/0076; H04L 67/06; H04L 47/19; H04L 45/306; H04L 45/00;
(Continued)

(56) References Cited

U.S. PATENT DOCUMENTS

2002/0154759 A1* 10/2002 Ishii .................. G06Q 20/12
379/373.01
2004/0151186 A1 8/2004 Akama
(Continued)

FOREIGN PATENT DOCUMENTS

AU 2007 231 759 A1 5/2009
CN 101849380 A 9/2010
(Continued)

OTHER PUBLICATIONS

Dogar et al., "Ditto—A System for Opportunistic Caching in Multi-hop Wireless Networks," Sep. 14-19, 2008, MobiCom '08, pp. 1-17.*
(Continued)

Primary Examiner — Le H Luu
(74) Attorney, Agent, or Firm — NSIP Law

(57) ABSTRACT

Provided is a communication method of a node overhearing content in a content centric network (CCN) and the node, the communication method including, overhearing a content transmitted from a neighboring node, caching the overheard content, and providing the overheard content, in response to receiving a content request packet requesting the overheard content.

22 Claims, 7 Drawing Sheets

(58) Field of Classification Search
CPC ......... H04L 29/08729; H04L 29/08801; H04L 67/2842; H04L 67/2857; H04L 67/327; H04W 4/005; H04W 52/0251; H04W 52/0258
See application file for complete search history.

(56) References Cited

U.S. PATENT DOCUMENTS

| | | | |
|---|---|---|---|
| 2009/0288163 A1 | 11/2009 | Jacobson et al. | |
| 2010/0195655 A1* | 8/2010 | Jacobson | H04L 45/00 370/392 |
| 2012/0158912 A1 | 6/2012 | Jacobson | |
| 2012/0158973 A1 | 6/2012 | Jacobson et al. | |
| 2013/0039249 A1 | 2/2013 | Ravindran et al. | |
| 2013/0058276 A1* | 3/2013 | Somasundaram | H04L 1/0076 370/328 |
| 2013/0282860 A1* | 10/2013 | Zhang | H04L 45/306 709/217 |
| 2014/0177497 A1* | 6/2014 | Backholm | H04W 52/0232 370/311 |
| 2014/0204816 A1* | 7/2014 | Ismail | H04W 52/0258 370/311 |
| 2014/0379872 A1* | 12/2014 | Eisl | H04L 67/06 709/219 |
| 2015/0055557 A1* | 2/2015 | Dong | H04W 4/70 370/328 |
| 2015/0146737 A1* | 5/2015 | Muscariello | H04L 47/19 370/400 |

FOREIGN PATENT DOCUMENTS

| | | |
|---|---|---|
| JP | 7-52991 A | 2/1995 |
| JP | 2011-244445 A | 12/2011 |
| KR | 10-2010-0056364 A | 5/2010 |
| KR | 10-2012-0060565 A | 6/2012 |
| KR | 10-2012-0095431 A | 8/2012 |
| KR | 10-2013-0013845 A | 2/2013 |

OTHER PUBLICATIONS

Wu et al., "Overhearing-aided Data Caching in Wireless Ad Hoc Networks," 2009, IEEE, pp. 137-144.*
Chai, Wei Koong, et al. "Cache "less for more" in information-centric networks (extended version)." Computer Communications vol. 36, No. 7, XP028526440, (Jan. 29, 2013): 758-770.
Extended European Search Report dated Nov. 21, 2014 in counterpart European Application No. 14171945.0 (11 pages, in English).
Jacobson, Van, et al. "Networking named content." Proceedings of the 5th International conference on Emerging networking experiments and technologies. ACM, XP002608160 (Submitted: Oct. 13, 2009;Published:Dec. 1-4, 2009): 1-12. (13 pages with coversheet, in English).
Kutscher, D. et al. "ICN Research Challenges; draft-kutscher-icnrg-challenges-00.txt", ICN Research Challenges; draft-kutscher-icnrg-challenges-00.txt, Internet Engineering Task Force, IETF; Standardworkingdraft, Internet Society (ISOC), XP015089905, (Feb. 10, 2013): 1-20.
Wu, Weigang, et al. "Design and performance evaluation of overhearing-aided data caching in wireless ad hoc networks." IEEE Transactions on Parallel and Distributed Systems, vol. 24, No. 3, XP011489047, (Mar. 1, 2013): 450-463.
Dogar, Fahad R., et al., "Ditto—A System for Opportunistic Caching in Multi-hop Wireless Networks," *Proceedings Of The 14th ACM International Conference On Mobile Computing and Networking*, San Francisco, California, Sep. 2008 (12 pages, in English).
Yokose, Hiroaki, et al., "A Method for Eliminating Redundant Traffic using Piece Dividing and Overhearing," *Proceedings of the IEICE Technical Report*, Mobile Multimedia Communications, vol. 112, No. 44, May 2012, pp. 45-50.
Japanese Office Action dated Jan. 30, 2018, in corresponding Japanese Application No. 2014-120496 (3 pages in English, 3 pages in Japanese).
Chinese Office Action dated Feb. 9, 2018 in corresponding Chinese Application No. 201410259024.9 (15 pages in English, 10 pages in Chinese).

* cited by examiner

COMMUNICATION METHOD OF NODE OVERHEARING CONTENT IN CONTENT CENTRIC NETWORK AND NODE

CROSS-REFERENCE TO RELATED APPLICATION(S)

This application is a continuation of U.S. patent application Ser. No. 14/300,365 filed on Jun. 10, 2014 which claims the benefit under 35 U.S.C. § 119(a) of Korean Patent Application No. 10-2013-0066716, filed on Jun. 11, 2013, in the Korean Intellectual Property Office, the entire disclosure of which is incorporated herein by reference for all purposes.

BACKGROUND

1. Field

Exemplary embodiments relate to a communication method of a node overhearing content in a content centric network (CCN) and the node.

2. Description of Related Art

In a manner contrary to Internet Protocol (IP)-based networking in which source and destination addresses are used, a name-based network such as a content centric network (CCN) involves representing a name of a desired content in a header of a packet. In this instance, each router configures a routing table to forward the packet to a location in which the content is placed, based on the name of the content written in the packet header. All networking devices including the routers store the content in a cache storage such as a content store (CS).

When a networking device receives a content request packet, the networking device conducts a search of a cache storage of the networking device by the name of the content in the packet header, and when the content is present in the cache storage, transmits the content to a requester in a form of a packet carrying the content. The name-based network may reduce an average transmission path and a total network usage because the name-based network allows an intermediate node, rather than an original owner, to provide an immediate reply when the corresponding content is present in a cache storage of the intermediate node.

SUMMARY

In one general aspect, there is provided a communication method of a node in a content centric network (CCN), the communication method including overhearing a content transmitted from a neighboring node, caching the overheard content, and providing the overheard content, in response to receiving a content request packet requesting the overheard content.

The overhearing may include verifying whether an entry matched to a name of the overheard content is present by referring to a management table storing entries including a name of at least one content, and determining whether to forward the overheard content, based on a result of the verification.

The determining of whether to forward the overheard content may include exerting control to forward the overheard content to a pre-caching filter, when the entry matched to the name of the overheard content is absent in the management table.

The caching of the overheard content may include caching the overheard content irrespective of whether the node receives the content request packet.

The caching of the overheard content may include caching the overheard content based on whether the overheard content corresponds to a content for a particular purpose.

The particular purpose may include at least one of unicast traffic, multicast traffic, and broadcast traffic.

The caching of the overheard content may include caching the overheard content in a content store (CS) of the node.

The communication method may further include filtering the overheard content based on a name of the content.

The name of the content may include information associated with at least one of a location, a situation, and a service related to the content.

The filtering may include forwarding the overheard content to the pre-caching module when the name of the overheard content matches a content name for filtering.

The filtering may include forwarding the overheard content to a pending interest table (PIT) of the node when the name of the overheard content does not match the content name for filtering.

In another general aspect, there is provided a node in a CCN based on a name of a content, the communication method including an overhearing module to overhear a content transmitted from a neighboring node, and a pre-caching module to cache the overheard content.

The overhearing module may include a management table to store entries including a name of at least one overheard content, and the overhearing module may determine whether to forward the overheard content based on whether an entry matched to a name of the overheard content is present in the management table.

The overhearing module may exert control to forward the overheard content to a pre-caching filter, when the entry matched to the name of the overheard content is absent in the management table.

The pre-caching module may cache the overheard content irrespective of whether the node receives a content request packet.

The pre-caching module may pre-cache the overheard content based on whether the overheard content corresponds to a content for a particular purpose.

The particular purpose may include at least one of unicast traffic, multicast traffic, and broadcast traffic.

The node may further include a pre-caching filter to filter the overheard content based on a name of the content.

The pre-caching filter may forward the overheard content to the pre-caching module when the name of the overheard content matches a content name for filtering, and the pre-caching filter may forward the overheard content to a PIT when the name of the overheard content does not match the content name for filtering.

Other features and aspects will be apparent from the following detailed description, the drawings, and the claims.

Figure 1:
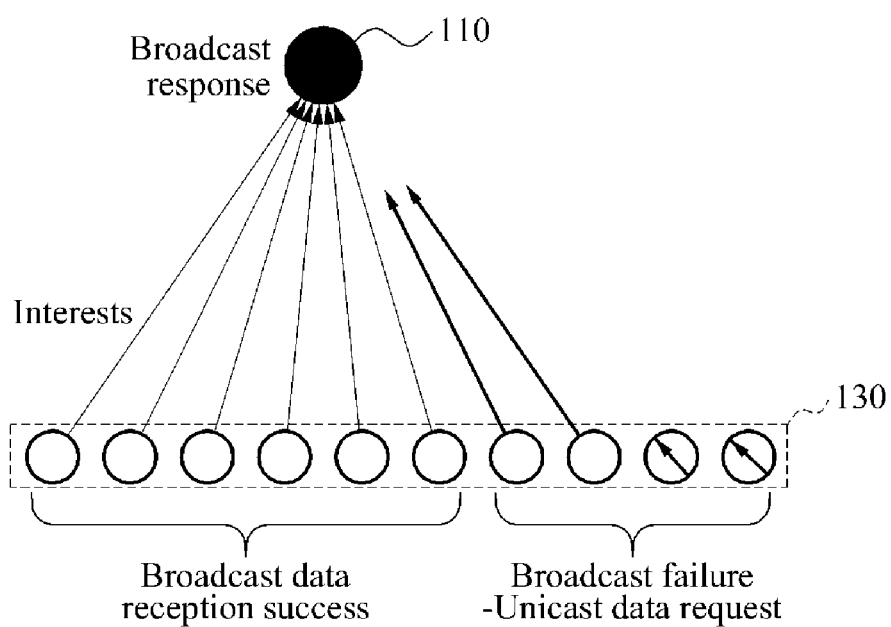
FIG. 1 is a diagram illustrating operation of a content centric network (CCN) layer in a case of a plurality of content requesters requesting content in a wireless network environment according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments will be described in detail with reference to accompanying drawings. The exemplary embodiments may be embodied in various forms without being limited to the exemplary embodiments set forth herein. Like reference numerals refer to the like elements throughout.

Hereinafter, a node may be understood as including a networking device, for example, a customer electronics (CE) device such as user equipment (UE), an access point, a router, and the like. The CE device include, for example, smart phones, smart TVs, personal computers (PCs), laptop computers, robot cleaners, and the like. A content centric network (CCN) may be a type of information centric networking describing various networking architectures in which a content is fetched based on a name of the content, and the following disclosure may be equally applied to an information centric network as well as a CCN.

FIG. 1 is a diagram illustrating operation of a CCN layer in a case of a plurality of content requesters requesting content in a wireless network environment according to an exemplary embodiment.

Referring to FIG. 1, a protocol operation method in a CCN is centered around transmitting a content request packet and receiving content in response to the packet. When an arbitrary node, for example, a plurality of content requesters 130, transmits a content request packet in a wireless environment, a content owner 110 may transmit a content in response to the packet.

When the plurality of content requesters 130 requests the content concurrently from the content owner 110 in the wireless network environment and the content owner 110 responds to the request, traffic may be concentrated on the content owner 110. A processing delay caused by the content owner 110 processing and responding to all the requests may result in transmission delay of the content.

In a case of requests from the plurality of content requesters 130, the content owner 110 or an intermediate node may perform broadcast or multicast, thereby improving a content transmission rate.

Even though the content is broadcast to all the nodes, in this example, the plurality of content requesters 130 in a CCN layer, the content may be dropped before processing of the content request packet requesting the corresponding content. Before reception of the content request packet, the content may be dropped rather than being cached even though the broadcast content is received at the node.

When the same content is requested from the plurality of content requesters 130 concurrently, a bottle neck phenomenon may occur in the content owner 110, and accordingly, broadcast or multicast may be required. However, the content transmitted via broadcast may not be used in the CCN layer until the content request packet is received. A receiving rate may be reduced due to low transmission reliability of broadcast or multicast in the wireless network environment.

Figure 2:
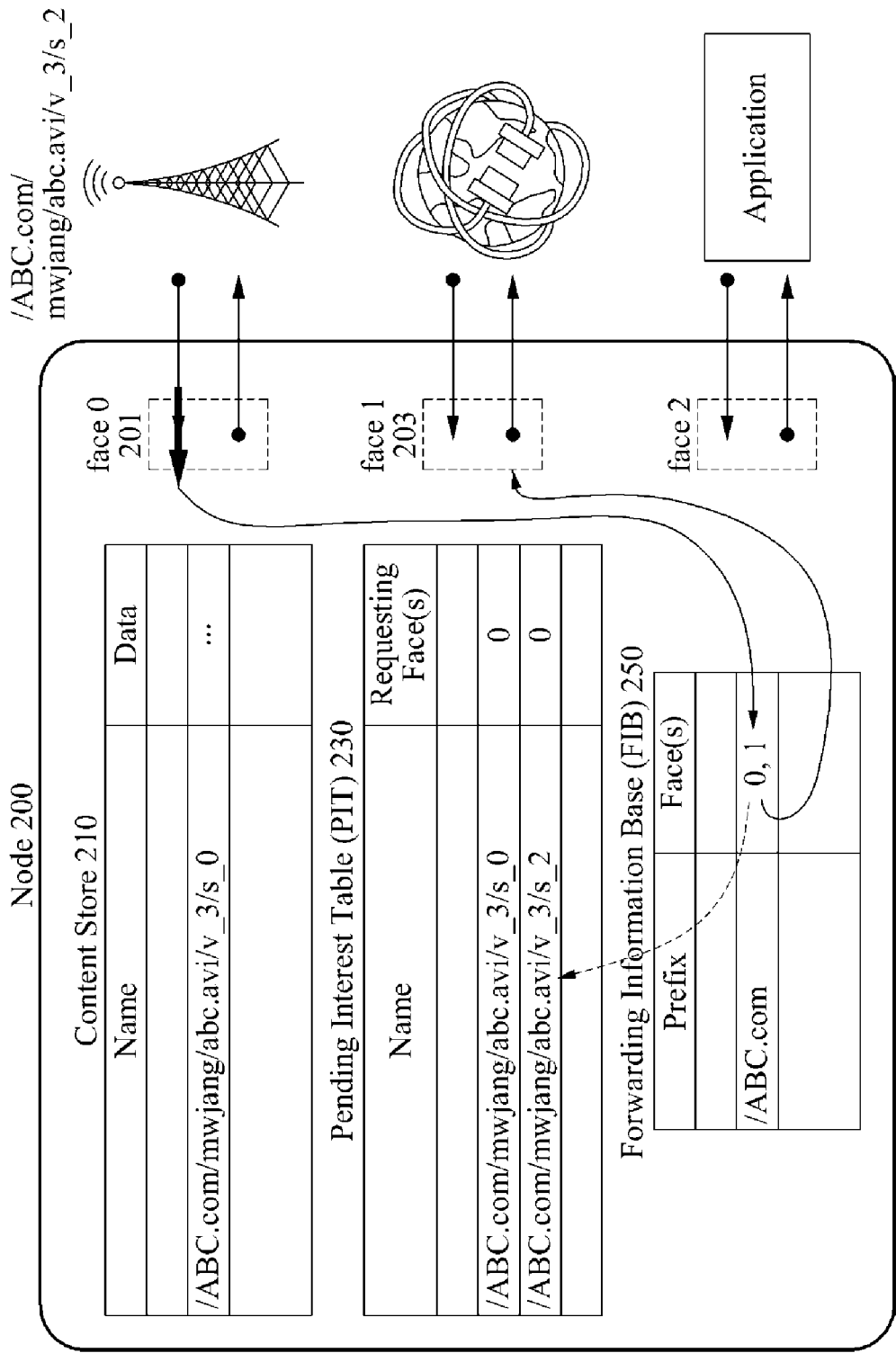
FIG. 2 is a diagram illustrating a method of processing a content request packet in a node in a CCN according to an exemplary embodiment.

FIG. 2 is a diagram illustrating a method of processing a content request packet in a node in a CCN according to an exemplary embodiment.

Referring to FIG. 2, an example of processing a content request packet in a CCN as an example of an information-based network is illustrated.

A node 200 included in a CCN may include a face 0 201, a face 1 203, a face 2 connected to an application, a content store (CS) 210, a pending interest table (PIT) 230, and a forwarding information base (FIB) 250. The term "face" refers to a path through which a content request packet is received, and may be interchangeable with the term "interface".

When a content request packet requesting a content corresponding to a name, for example, "/ABC.com/mwjang/abc.avi/v_3/s_2" generated at a neighboring node or an application layer arrives at a CCN layer via the face 0 201, the node 200 performs processing by transmitting the content request packet to the CS 210, the PIT 230, and the FIB 250 in a sequential order.

The node 200 conducts a search to determine whether the corresponding content is present in the CS 210. When the corresponding content or data is present in the CS 210, the node 200 transmits a response message, for example, a packet carrying the content, via the face 0 201 through which the content request packet is received, in response to the content request packet.

When the corresponding content is absent in the CS 210, the node 200 verifies whether an entry stored with the same name of the content is present in the PIT 230. To verify whether the same content request message is currently being processed, the node 200 verifies whether the corresponding entry is present in the PIT 230.

When the entry stored with the same name of the content is present in the PIT 230, as shown in FIG. 2, the node 200 adds, to the corresponding entry, information associated with the face on which the content request packet comes in, that is, a requesting face, in this example, the face 0 201, to recall a direction in which the content request message is received.

When the corresponding entry is absent in the PIT 230, the node 200 determines a direction in which the content request packet is to be forwarded through FIB lookup, and forwards the content request packet to a next node.

In this example, the node 200 performs a name-based lookup in the FIB 250. The node 200 conducts a search for information associated with a prefix of the content name and a prefix registered in an entry of the FIB 250, using longest prefix matching, for example, "/ABC.com".

The node 200 determines a face to be used to forward the content request packet, in this example, the face 1 203, based on information registered in the FIB 250, and forwards the content request packet via the face 1 203.

In this example, the node 200 registers, in the PIT 230, information '0' regarding the incoming face 0 201 via which the content request packet is received. Registration is performed to transmit a data packet including the corresponding content to a node requesting the corresponding content via the incoming face 0 201 when the data packet is received at future instances.

When selecting a face to be used to forward the content request packet based on the FIB 250, the node 200 may exclude the face via which the content request packet is received, in this example, the face 0 201 from face candidates, to avoid a phenomenon in which the content request packet is transmitted iteratively, for example, a loop.

When the node 200 receives the content, in particular, the content requested through the content request packet after forwarding the content request packet to the next node, the node 200 examines whether an entry matched to the content request packet is present by referring to the PIT 230.

When the matched entry is present in the PIT 230, the node 230 forwards the corresponding content in the direction in which the content request packet is received, and caches the received corresponding content in the CS 210.

According to circumstances, the node 200 may receive the content before the content request packet generated at the neighboring node or the application layer arrives at the CCN layer. In this instance, in the CCN layer, the node 200 drops the corresponding content because records of messages requesting the corresponding content, for example, records of entries of the PIT 230, are absent.

Figure 3:
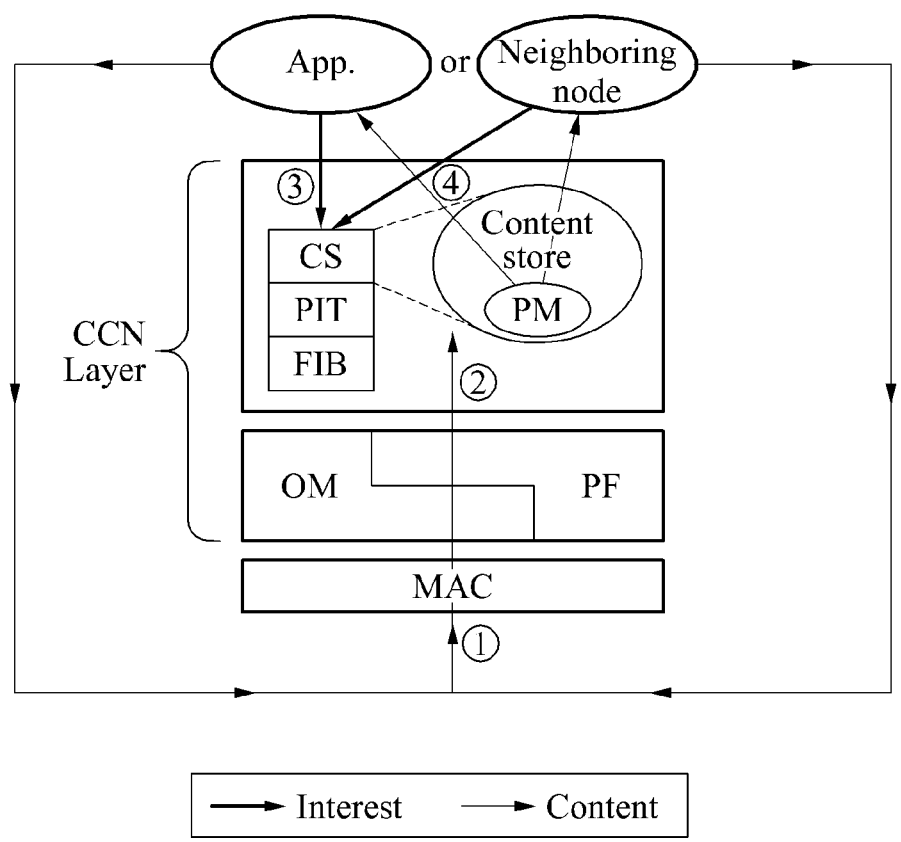
FIG. 3 is a diagram illustrating a structure of a CCN layer for providing an overheard content in a CCN according to an exemplary embodiment.

FIG. 3 is a diagram illustrating a structure of a CCN layer for providing an overheard content in a CCN according to an exemplary embodiment.

Referring to FIG. 3, in a wireless environment, a CCN layer may allow content overhearing of a neighboring node or application layer (①). Also, the CCN layer may allow pre-caching of the overheard content in a CS (②). Subsequently, the CNN layer may receive a content request packet, also referred to as an interest, generated from the application layer or the neighboring node (③). When a content required by the content request packet matches the content pre-cached in the CS, the CCN layer may provide the content cached in the CS to the neighboring node or the application layer (④).

According to an exemplary embodiment, the CCN layer may provide the content more quickly by enabling internal processing of the content request packet generated from the application layer or the neighboring node. The CCN layer may suppress the content request packet from being transmitted to the outside by enabling internal processing of the content request packet in the CS of the node, thereby reducing consumption of radio resources.

Through content overhearing, the CCN layer may allow activation of distribution of network traffic by responding to the request from the neighboring device using the pre-cached content, instead of a content owner.

A communication method of a node overhearing a content described in the following may be equally applied to a wired network environment allowing overhearing as well as a wireless network environment.

Figure 4:
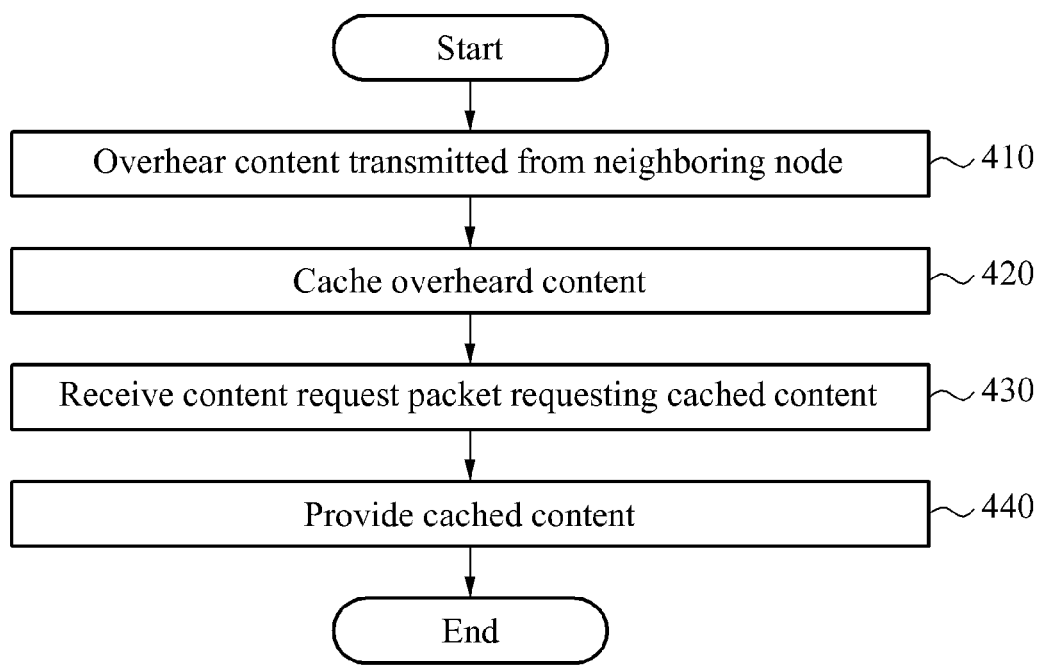
FIG. 4 is a flowchart illustrating a communication method of a node in a CCN according to an exemplary embodiment.

FIG. 4 is a flowchart illustrating a communication method of a node in a CCN according to an exemplary embodiment.

Referring to FIG. 4, in 410, a node according to an exemplary embodiment may overhear a content transmitted from a neighboring node.

In 420, the node may cache, in a caching device, the content overheard in 410.

Generally, when the content is received before processing of the content request packet in a CCN layer, the corresponding content may not be cached in a CS. For example, when a content unmatched to an entry of a PIT is received, the CCN layer may disallow the corresponding content from being cached in the CS.

In an exemplary embodiment, by expanding a function of the CS, the content may be pre-cached even though the content is received before arrival of the content request packet. For example, in an exemplary embodiment, even though the content unmatched to an entry of a PIT is received, the corresponding content may be temporarily stored. In this example, the content overheard in 420 may be cached in a CS or a cache provided separately for pre-caching.

The content pre-cached in 420 may correspond to a content for a special purpose of transmitting to a plurality of nodes, for example, unicast traffic, broadcast traffic, or multicast traffic. For example, the content pre-cached in 420 may correspond to a content having a particular transmission type. In a case in which the content is transmitted to the plurality of nodes via broadcast or multicast and a receiving node overhears the content in the CCN layer, transmission performance of broadcast or multicast may be improved.

In the future, when a content request packet generated from an application layer arrives at the CCN layer, the overheard and cached content may be transmitted to the application layer immediately. Accordingly, limited radio resources may be saved because the content request packet is processed internally rather than externally.

Also, when a request for the corresponding content is made from a neighboring node, the node in which the overheard content is cached may process a content request packet locally rather than transmitting the content request packet to a content owner.

In 430, the node may receive the content request packet requesting the overheard content.

In 440, the node may provide the overheard content to a node requesting the corresponding content in response to receiving the content request packet.

Figure 5:
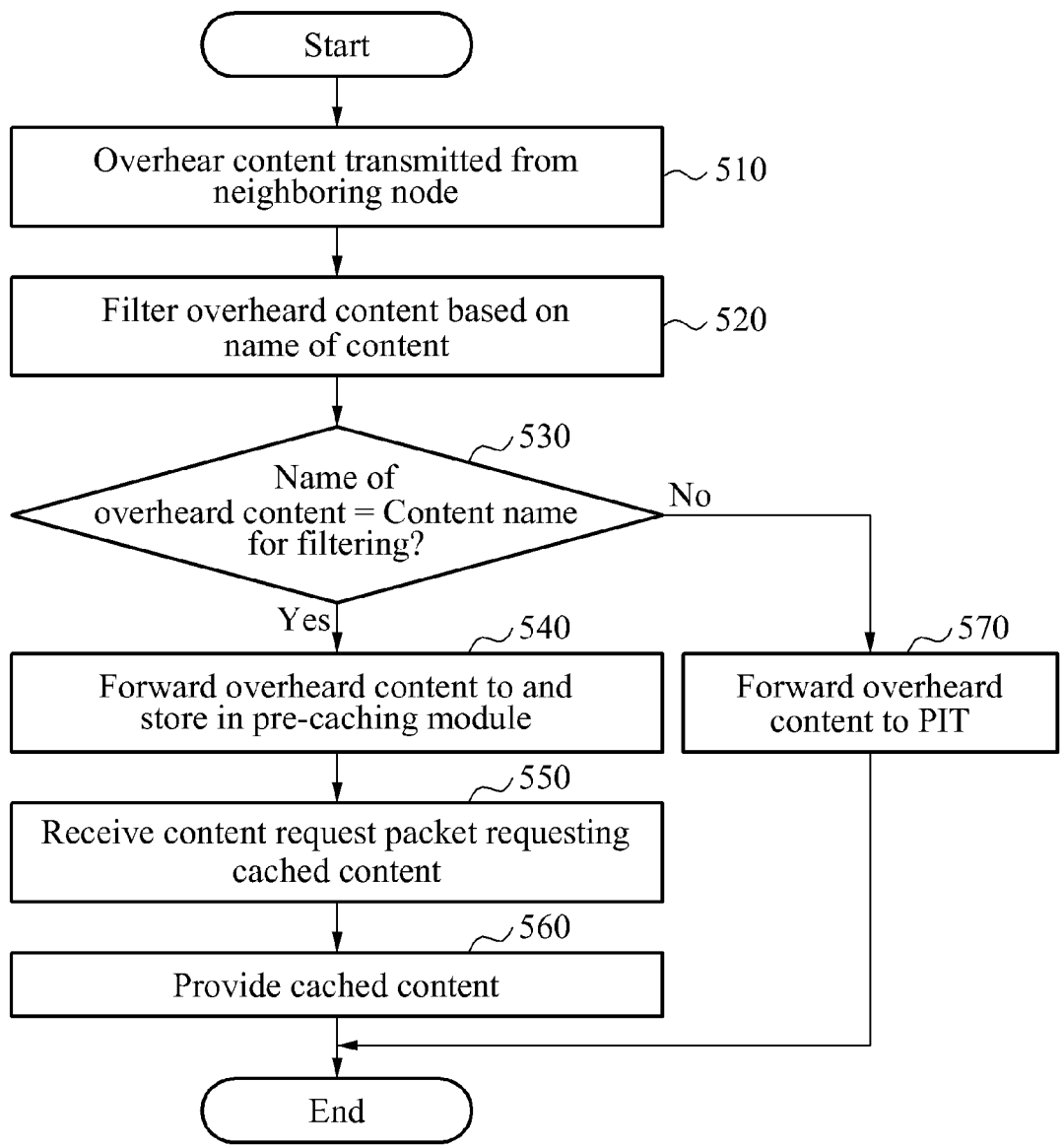
FIG. 5 is a flowchart illustrating a communication method of a node in a CCN according to another exemplary embodiment.

FIG. 5 is a flowchart illustrating a communication method of a node in a CCN according to another exemplary embodiment.

Referring to FIG. 5, a node according to another exemplary embodiment may overhear a content transmitted from a neighboring node in 510.

In 520, the node may filter the content overheard in 510, based on a name of the content. The content name for filtering in 520 may include information associated with at least one of a location, a situation, and a service related to the content. The location related to the content may include, for example, a shopping mall, a classroom, and the like. The situation related to the content may include, for example, e-meeting. The service related to the content may include, for example, a communication service type such as a multicast traffic service and a broadcast traffic service as well as a sports game smart class.

According to an exemplary embodiment, high-quality high-capacity contents, for example, a sports game, e-meetings, a smart class, and the like, may be distributed even in an infra-less environment by using an overheard content when providing a requested content.

According to exemplary embodiments, the content name for filtering may include information associated with a period of time over which the overheard content is cached or information associated with a period of time over which the overheard content is cached in a particular space. For example, the name of the content for filtering may include information enabling a content overheard during an e-meeting to be maintained in a CS during the corresponding situation, that is, during the e-meeting.

In 530, the node may determine whether the name of the content overheard in 510 matches the content name for filtering in 520.

When the name of the overheard content is determined not to match the content name for filtering in 530, the node may forward the overheard content to a PIT of the node overhearing the content in 570.

When the name of the overheard content matches the content name for filtering in 530, the node may forward the overheard content to and cache in a pre-caching module in 540.

After the node forwards the overheard content to and caches in the pre-caching module, the node may receive a content request packet requesting the overheard content in 550.

In response to receiving the content request packet requesting the overheard content, the node may provide the overheard content to a node requesting the corresponding content in 560.

Figure 6:
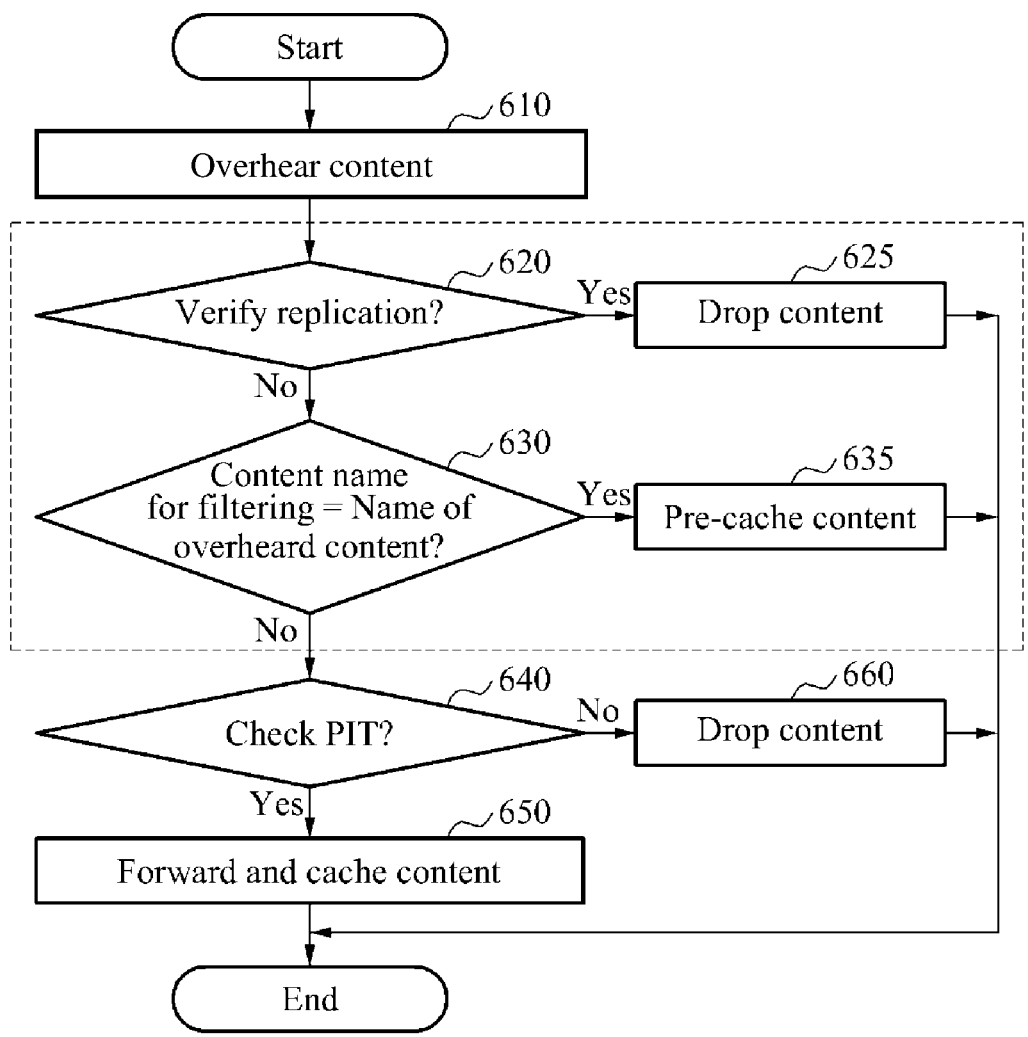
FIG. 6 is a flowchart illustrating a communication method of a node in a CCN according to still another exemplary embodiment.

FIG. 6 is a flowchart illustrating a communication method of a node in a CCN according to still another exemplary embodiment.

Referring to FIG. 6, when a content overheard from a neighboring node or a content received from an upper layer, for example, an application layer, arrives at a CCN in 610, a node according to still another exemplary embodiment may verify whether overlapping of the content exists, using an overhearing module in 620.

In 620, the node may determine whether an entry matched to a name of the overheard content is present in a management table. The management table may be included in the overhearing module, and may store entries including a name of at least one content overheard from the neighboring node or received from the application layer. The node may determine whether to forward the overheard or received content based on a result of the determination in 620. Hereinafter, the overheard content may be understood as including the content received from the upper layer.

When the entry matched to the name of the overheard content is present in the management table in 620, the node may drop the overheard content in 625 and may terminate the operation. The presence of the entry matched to the name of the overheard content may imply that a presence of a same content overheard previously. In this case, to reduce a waste of network resources caused by caching the same content iteratively for each layer, the overheard content may be dropped in 625.

When the entry matched to the name of the overheard content is absent in the management table in 620, the node may control to forward the overheard content to a pre-caching filter. The node may determine whether the name of the overheard content matches a content name for filtering using the pre-caching filter in 630.

When the name of the overheard content matches the content name for filtering in 630, the node may pre-cache the overheard content using a pre-caching module in 635 and may terminate the operation. The matching of the name of the overheard content to the content name for filing in 630 may imply that the overheard content corresponds to a content for a preset special purpose. In this case, the overheard content corresponding to the content for the preset particular purpose may be pre-cached. The particular purpose may include at least one of unicast traffic, multicast traffic, and broadcast traffic.

When the name of the overheard content does not match the content name for filtering in 630, the node may process the overheard content like a non-overheard content. The node may verify whether an entry corresponding to the overheard content is present in a PIT in 640. When the entry corresponding to the overheard content is present in the PIT as a result of the verification in 640, the node may forward the overheard content to a node requesting the corresponding content in 650. Also, the node may cache the overheard content in a CS in 650.

When the entry corresponding to the overheard content is absent in the PIT as the result of the verification in 640, the node may determine that there is no node requesting the overheard content and may drop the overheard content in 660.

The node according to an exemplary embodiment may overhear a content request packet transmitted from a neighboring node as well as the content. The node may process the overheard content request packet in the same method as the overheard content. The methods described through FIGS. 4 through 6 may be equally applied to the content request packet overheard by the node.

Figure 7:
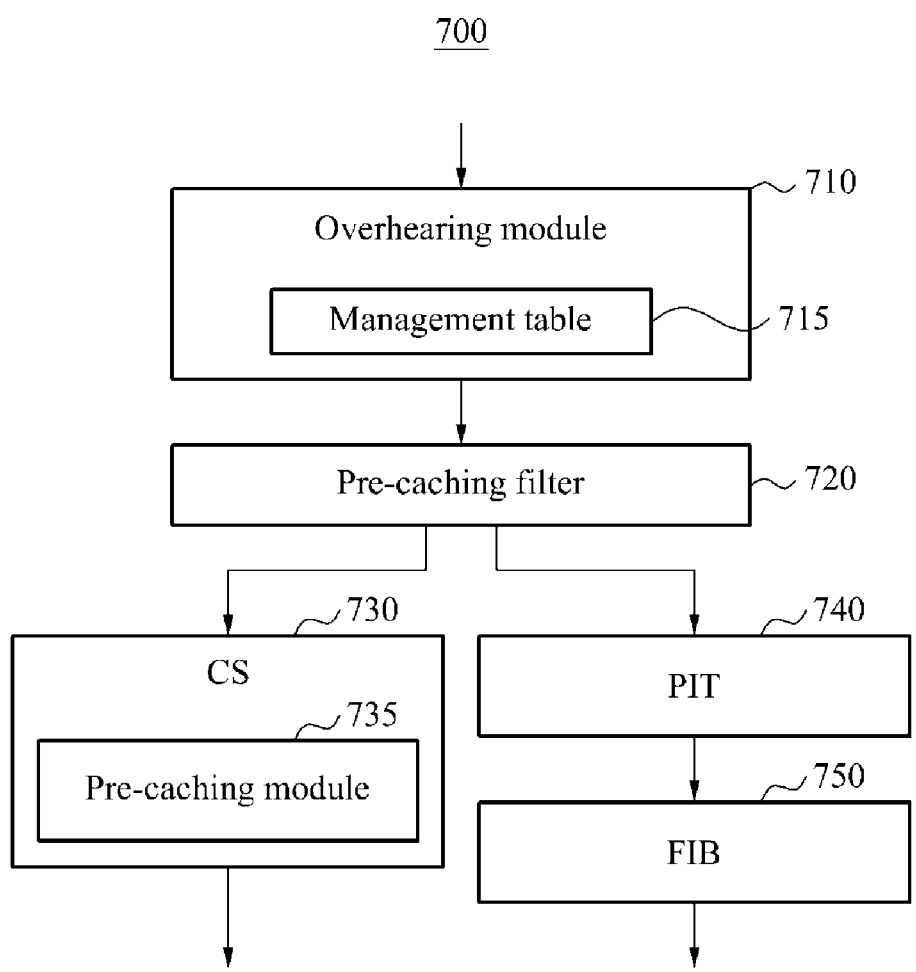
FIG. 7 is a block diagram illustrating a node in a CCN according to an exemplary embodiment.

FIG. 7 is a block diagram illustrating a node in a CCN according to an exemplary embodiment.

Referring to FIG. 7, a node according to an exemplary embodiment may include an overhearing module 710, a pre-caching filter 720, a CS 730, a PIT 740, and an FIB 750.

The overhearing module 710 may overhear a content transmitted from a neighboring node. The overhearing module 710 may include a management table 715 to store an entry including a name of at least one overheard content.

The overhearing module 710 may determine whether to forward the overheard content, based on whether an entry matched to a name of the overheard content is present in the management table 715. For example, the overhearing module 710 may suppress the overheard content from being forwarded to a pre-caching module 735 when the entry matched to the name of the overheard content is present in the management table 715. When the entry matched to the name of the overheard content is absent in the management table 715, the overhearing module 710 may forward the overheard content to the pre-caching module 735 or the pre-caching filter 720.

The pre-caching filter 720 may filter the overheard content based on the name of the content. When the name of the overheard content matches a content name for filtering, the pre-caching filter 720 may forward the overheard content to the pre-caching module 735. When the name of the overheard content does not match the content name for filtering, the pre-caching filter 720 may forward the overheard content to the PIT 740.

The CS 730 may include the pre-caching module 735. The pre-caching module 735 may cache the content overheard by the overhearing module 710.

The pre-caching module 735 may cache the overheard content irrespective of whether the node receives a content request packet requesting the overheard content.

The pre-caching module 735 may pre-cache the overheard content based on whether the overheard content corresponds to a content for a particular purpose. The particular purpose may include at least one of multicast traffic and broadcast traffic.

For basic operations of the CS 730, the PIT 740, and the FIB 750, reference may be made to the description of FIG. 2.

According to an exemplary embodiment, the CCN layer may improve broadcast and multicast efficiency by pre-caching, in the CS, the packet received through content overhearing and by performing internal processing of the content request packet generated from the application layer or the neighboring node.

According to an exemplary embodiment, the CCN layer may suppress the content request packet from being transmitted externally by enabling internal processing of the content request packet in the CS of the node, thereby reducing consumption of radio resources.

Also, the CCN layer may improve activation of distribution of network traffic by responding to the request from the neighboring device using the content pre-cached through content overhearing, instead of a content owner.

The methods described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of communicating, comprising:
   detecting, at a content centric network (CCN) layer of a device operating in a CCN, content being transmitted from a first external device to a second external device;
   storing the detected content in a content store (CS) of the CCN layer;
   identifying a content request generated by a third external device;
   determining whether a content name in the content request corresponds to the content stored in the device; and
   transmitting, via a wireless communication, the content to the third external device based at least in part on a determination that the content name in the content request corresponds to the content stored in the device,
   wherein the detecting comprises receiving the detected content before the device receives a content request corresponding to the detected content.

2. The method of claim 1, wherein the detecting comprises:
   receiving the content before the device generates a request for the content.

3. The method of claim 1, wherein the storing comprises:
   caching the content temporarily in memory operatively coupled with the device.

4. The method of claim 1, wherein the storing comprises:
   storing the content based at least in part on a determination that the second external device includes at least two devices.

5. The method of claim 1, wherein the storing comprises:
   storing the content based at least in part on a determination that a name of the detected content includes specified information in relation with a location, a situation, or a service.

6. The method of claim 5, wherein the name of the detected content comprises a period of time over which the detected content is to be used, and wherein the storing comprises:
   storing the content during the period of time.

7. The method of claim 1, wherein the storing comprises:
   storing the content based at least in part on a determination that history information with respect to the content is absent in a management table.

8. The method of claim 1, wherein the determining comprises:
   comparing the content request with the detected content without using an internet protocol address.

9. The method of claim 1, wherein the content request generated by the third external device is transmitted from the third external device to the first external device.

10. The method of claim 1, wherein the first external device corresponds to an owner of the content.

11. The method of claim 1, wherein the CCN layer further comprises a pending interest table (PIT), and a forwarding information base (FIB), and the device transmits the content request to the CS, the PIT, and the FIB in a sequential order.

12. The method of claim 11, wherein the device determines whether the content name is stored in the CS, and upon the content being absent in the CS, the device verifies whether the content name is stored is stored in the PIT.

13. An electronic device, comprising:
    a communication interface capable of supporting a wireless communication in a content centric network (CCN);
    memory; and
    a processor configured to:
      detect, in a CCN layer of a device operating in the CCN, content being communicated between a first external device and a second external device;
      receive the detected content before the device receives a content request corresponding to the detected content;
      store the content in a content store (CS) of the CCN layer in the memory;
      receive a content request transmitted from a third external device;
      determine whether a content name in the content request corresponds to the content stored in the memory; and
      transmit, using the communication interface, the content to the third external device based at least in part on a determination that the content name in the content request corresponds to the content stored in the memory.

14. The electronic device of claim 13, wherein the processor is configured to:
    receive, as at least part of the detecting, the content without a request for the content generated by the electronic device.

15. The electronic device of claim 13, wherein the processor is configured to:

cache, as at least part of the storing, the content temporarily in the memory.

16. The electronic device of claim 13, wherein the processor is configured to:
perform the storing based at least in part on a determination that the second external device includes at least two devices.

17. The electronic device of claim 13, wherein the processor is configured to:
perform the storing based at least in part on a determination that a name of the detected content includes specified information in relation with a location, a situation, or a service.

18. The electronic device of claim 13, wherein the name of the detected content comprises a period of time over which the detected content is used, and wherein the processor is configured to:
delete the content from the memory after the period of time.

19. The electronic device of claim 13, wherein the processor is configured to:
perform the storing based at least in part on a determination that history information with respect to the content is absent in a management table.

20. The electronic device of claim 13, wherein the content request is transmitted from the third external device to an owner device of the content.

21. The electronic device of claim 20, wherein the processor is configured to:
refrain from forwarding the content request to the owner device of the content.

22. A non-transitory machine-readable storage device storing instructions that, when executed by one or more processors, cause the one or more processors to perform operations comprising:
detecting, at a content centric network (CCN) layer of a device operating in a CCN, content being transmitted from a first external device to a second external device;
storing the detected content in a content store (CS) of the CCN layer;
identifying a content request generated by a third external device;
determining whether a content name in the content request corresponds to the content stored in the device; and
transmitting, via a wireless communication, the content to the third external device based at least in part on a determination that the content name in the content request corresponds to the content stored in the device.

* * * * *